(No Model.)
W. A. LORENZ.
BICYCLE ICE TIRE.
No. 303,228. Patented Aug. 5, 1884.
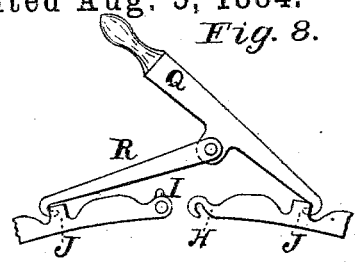
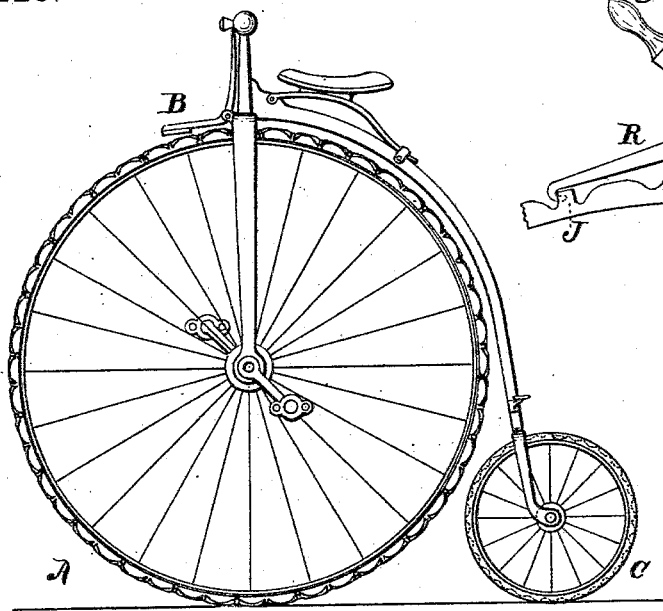
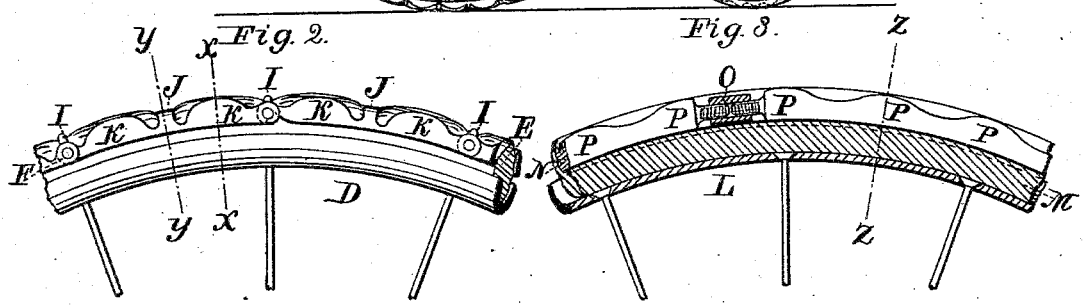
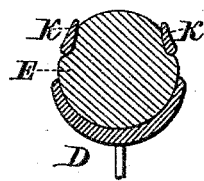
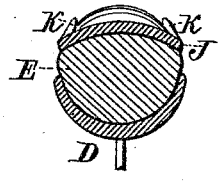
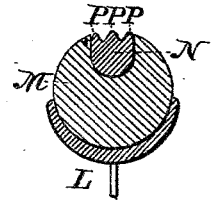
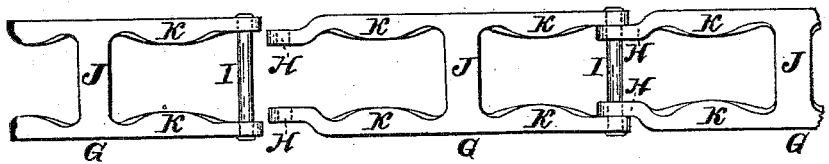
Witnesses:
Charles W. Manwaring
H. J. Williams
Inventor:
William A. Lorenz
By Albert H. Walker
Attorney.

UNITED STATES PATENT OFFICE.

WILLIAM A. LORENZ, OF HARTFORD, CONNECTICUT.

BICYCLE ICE-TIRE.

SPECIFICATION forming part of Letters Patent No. 303,228, dated August 5, 1884.

Application filed June 4, 1884. (No model.)

*To all whom it may concern:*

Be it known that I, WILLIAM A. LORENZ, of Hartford, Connecticut, have invented a new and useful Bicycle Ice-Tire, of which the following description and claims constitute the specification, and which is illustrated by the accompanying sheet of drawings.

This invention consists of a new and useful chain or hoop attached circumferentially to the periphery of a rubber bicycle-tire, and its function is to prevent a bicycle-wheel from slipping when running upon ice or upon any other smooth surface.

Figure 1 is a side elevation of a bicycle, the tire of the larger wheel of which is provided with my attachment in the form of a chain, while the tire of the smaller wheel of which is provided with my attachment in the form of a hoop. Fig. 2 is an enlarged view of an arc of the felly, tire, and chain attachment of the larger wheel of Fig. 1. Fig. 3 is an enlarged view of the felly, tire, and hoop attachment of the smaller wheel of Fig. 1. Fig. 4 is an enlarged cross-section on the line X X of Fig. 2. Fig. 5 is an enlarged cross-section on the line Y Y of Fig. 2. Fig. 6 is an enlarged cross-section on the line Z Z of Fig. 3. Fig. 7 is an enlarged fragmentary plan view of several of the links of the chain attachment. Fig. 8 is a view of a special hooking implement for drawing the chain attachment tightly around the tire of the wheel and hooking the two ends of the chain together when so drawn.

A is the larger wheel of the bicycle.

B is the brake, the bearing-surface of which may be made of soft rubber or of metal. If made of metal, that surface should have longitudinal grooves for the passage of the protuberances of the chain attachment, or the hoop attachment if the latter is used on the larger wheel.

C is the smaller wheel. D is the felly, and E is the rubber tire, of the larger wheel. F is the chain attachment. It consists of a series of peculiar links, G, connected together by the hooks H H on one end of each link engaging with the bar I on the adjacent end of the adjacent link. The series of bars I are curved upward in the middle portion, as shown in Fig. 2, as also are the straps J, one of which forms a part of each of the links G, as shown in Figs. 5 and 7. Each link has several protuberances, each of which is indicated by the letter K in Figs. 2, 4, 5, and 7.

L is the felly of the smaller wheel, and M is its rubber tire.

N is the hoop attachment. It is made of elastic metal, sits in a circumferential recess in the tire M, and is held firmly in place by the right and left hand nut O, working on corresponding right and left hand screw-threads cut on its ends, as shown in Fig. 3. The hoop attachment may also be provided with several rows of protuberances, each of which is indicated by the letter P in Figs. 3 and 6.

Q is a lever, the power-point of which is a handle, and the opposite end of which is a hook, and the middle part of which is pivoted to the hook R.

The mode of attaching the chain attachment is as follows: The chain is placed around the wheel so that the concave side of the chain rests upon the convex circumference of an ordinary rubber bicycle-tire on the wheel. Then the hook on the lever Q is hooked into the link on one end, and the hook R is hooked into the link on the other end, of the chain attachment, in the manner shown in Fig. 8. Then, by forcing the handle of the lever to the right, the pair of hooks H in Fig. 8 are hooked over the bar I in that figure. Thus adjusted to the rubber tire, the chain attachment is embedded in the tire, as shown in Figs. 2, 4 and 5.

The mode of attaching the hoop attachment is as follows: The hoop is placed around the wheel so that the convex side of the hoop, as shown in Fig. 6, rests within the concave circumferential groove shown in cross-section in that figure. Then, by means of the right and left hand nut O and its corresponding screw-threads on the ends of the hoop N, that hoop is drawn tightly into that groove, so that no part of the hoop projects beyond the circumference of the rubber tire, while the outer surfaces of the hoop are nearly or quite flush with that circumference.

The mode of operation of my invention is as follows: When the bicycle is running upon any smooth surface, each part of the periphery of each wheel is pressed successively upon that surface; that pressure compresses the presented parts of the rubber tires enough to carry the outer surfaces of the two attachments into contact with the surface upon which the bicycle is running, and thus effectually prevents all slipping of the bicycle-wheels. At the same time those parts of the rubber tires which are not presented to the surface upon which the bicycle is running are not compressed, and they therefore maintain the positions shown in that behalf in the drawings relatively to the chain and hoop attachment, respectively.

I claim as my invention—

A bicycle ice-tire consisting of a series of mutually-connected protuberances embedded in rubber, substantially as described.

WILLIAM A. LORENZ.

Witnesses:
ALBERT H. WALKER,
FRANK. H. PIERPONT.